(12) United States Patent
Ginis

(10) Patent No.: US 7,408,980 B2
(45) Date of Patent: Aug. 5, 2008

(54) SEMI-DISTRIBUTED POWER SPECTRUM CONTROL FOR DIGITAL SUBSCRIBER LINE COMMUNICATIONS

(75) Inventor: Georgios Ginis, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 611 days.

(21) Appl. No.: 11/003,308

(22) Filed: Dec. 2, 2004

(65) Prior Publication Data

US 2005/0220178 A1 Oct. 6, 2005

Related U.S. Application Data

(60) Provisional application No. 60/558,817, filed on Apr. 2, 2004.

(51) Int. Cl.
 *H04L 5/16* (2006.01)
(52) U.S. Cl. ........................... 375/219; 370/252
(58) Field of Classification Search .............. 375/220, 375/222, 225, 227; 370/241, 252, 286
 See application file for complete search history.

(56) References Cited

U.S. PATENT DOCUMENTS

| | | | |
|---|---|---|---|
| 5,479,447 | A | 12/1995 | Chow et al. |
| 6,292,559 | B1 | 9/2001 | Gaikwad et al. |
| 6,526,031 | B1 * | 2/2003 | Zaff et al. ............... 370/335 |

(Continued)

FOREIGN PATENT DOCUMENTS

WO WO 01/35607 A1 5/2001

(Continued)

OTHER PUBLICATIONS

Yu et al., "Distributed Multiuser power control for digital subscriber lines", IEEE Journal on Selected Areas in Communications, vol. 20, No. 5 (2002), pp. 1105-1115.

(Continued)

*Primary Examiner*—Khanh C Tran
(74) *Attorney, Agent, or Firm*—Steven A. Shaw; W. James Brady; Frederick J. Telecky, Jr.

(57) ABSTRACT

A semi-distributed method of managing the spectral power over multiple digital subscriber line communication loops (LP1, LP2) is disclosed. A central office (CO) DSL transceiver (10) and a remote terminal (RT) DSL transceiver (15) communicate with customer premises equipment (CPE) ($12_1$, $12_2$) over separate twisted-pair wire loops (LP1, LP2) that are in sufficient physical proximity with one another as to suffer from crosstalk. A network management center (NMC) (20) initializes a price parameter, which is used by the CO (10) and RT (15) in independent maximization problems. The CO (10) derives a maximum tolerable power spectral density for the RT (15) that permits the CO (10) to reach a target data rate, and the RT (15) derives an actual power spectral density that maximizes its data rate, each using the price parameter. The NMC (20) compares the actual RT power spectral density to the tolerable RT power spectral density, and adjusts the price parameter accordingly, with the process repeating until convergence. As a result, the RT data rate is maximized to a level that still permits the CO (10) to reach its target data rate, thus maximizing the overall network data rate.

14 Claims, 4 Drawing Sheets

U.S. PATENT DOCUMENTS

| | | | |
|---|---|---|---|
| 6,631,175 B2 * | 10/2003 | Harikumar et al. | ......... 375/350 |
| 2002/0176509 A1 | 11/2002 | Gatherer et al. | |
| 2003/0086514 A1 | 5/2003 | Ginis et al. | |
| 2004/0037216 A1 | 2/2004 | Redfern et al. | |

FOREIGN PATENT DOCUMENTS

WO        WO 01/35611 A1     5/2001

OTHER PUBLICATIONS

Cendrillon et al., "Optimal multiuser spectrum management for digital subscriber lines", 2004 IEEE International Conference on Communications, vol. 1, (Jun. 2004), pp. 1-5.

Starr et al., Understanding Digital Subscriber Line Technology (Prentice Hall, 1999), pp. 208-217.

* cited by examiner

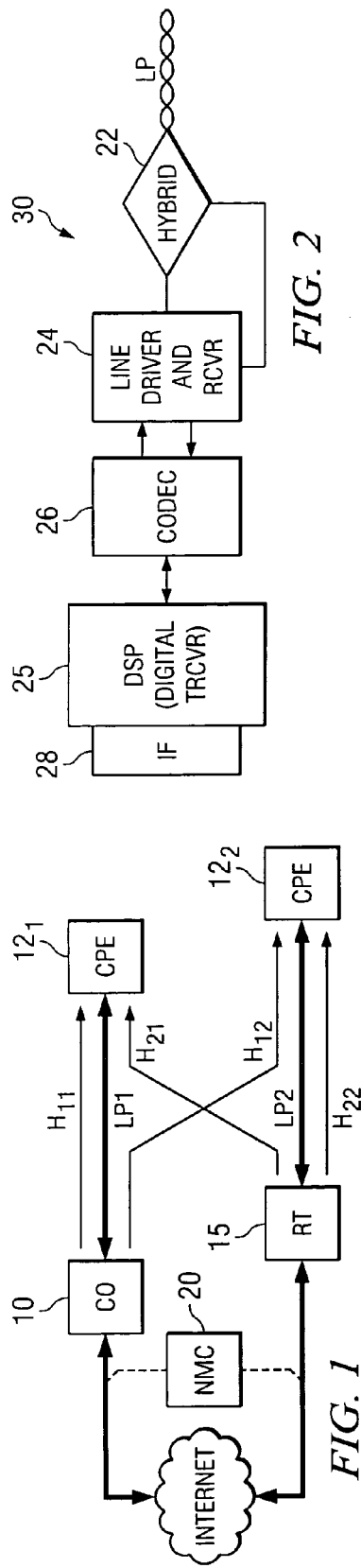
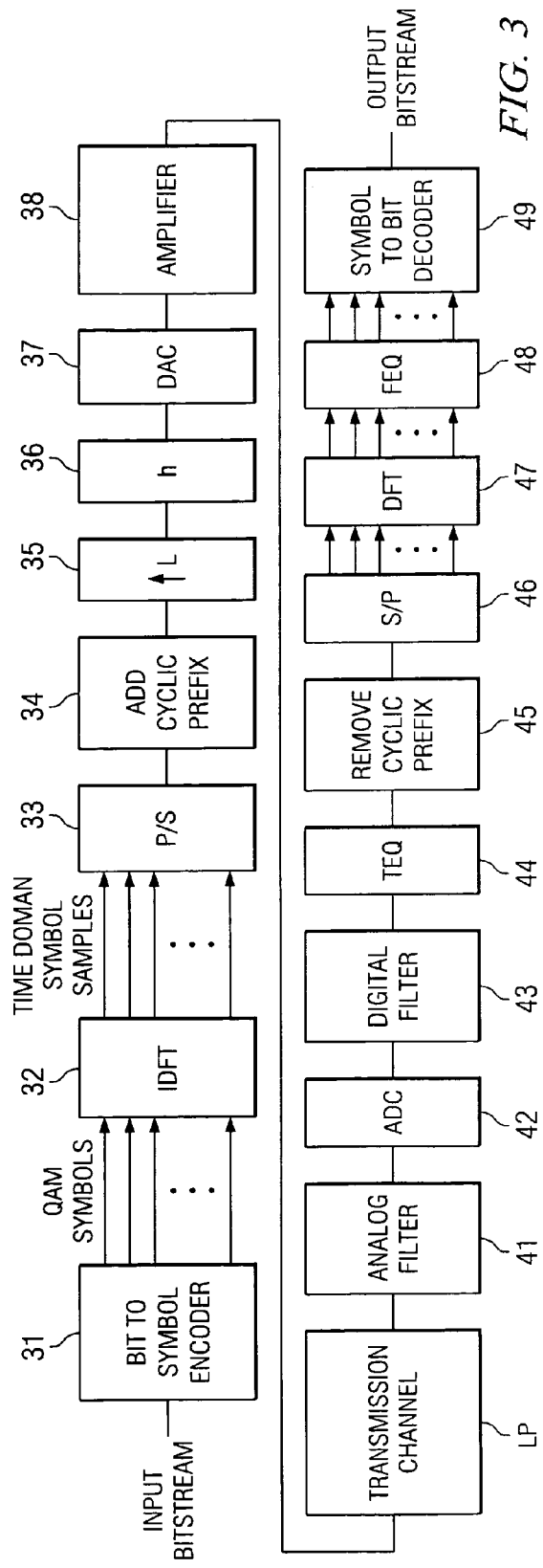
FIG. 1
FIG. 2
FIG. 3

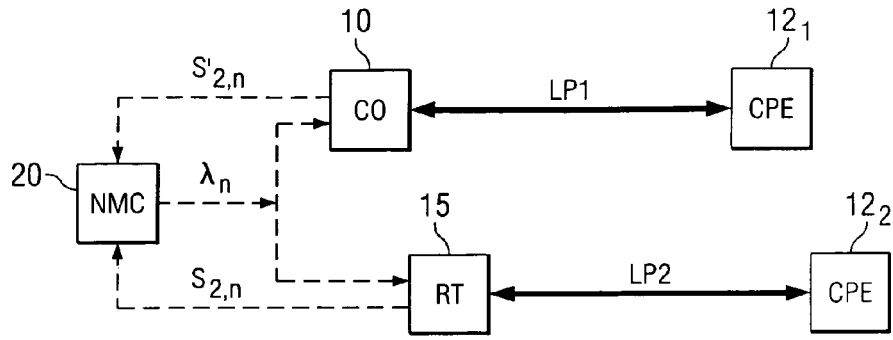
FIG. 5
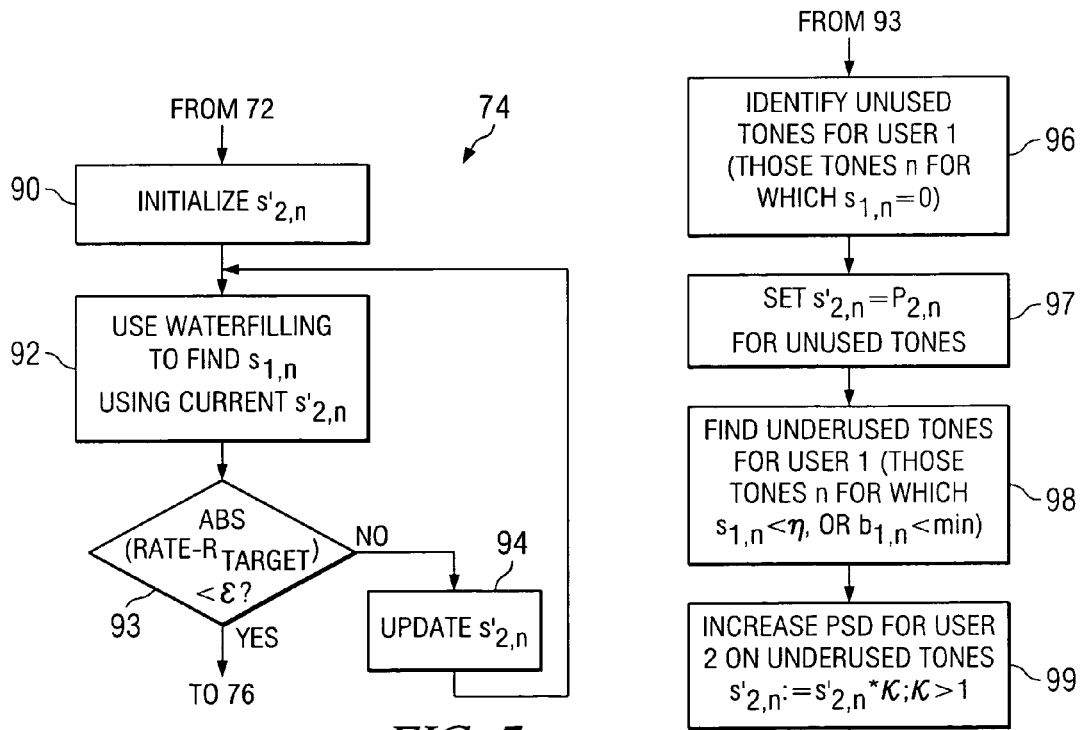
FIG. 7
FIG. 8

SEMI-DISTRIBUTED POWER SPECTRUM CONTROL FOR DIGITAL SUBSCRIBER LINE COMMUNICATIONS

CROSS REFERENCE TO RELATED APPLICATIONS

This application claims priority, under 35 U.S.C. §119(e), of Provisional Application No. 60/558,817, filed Apr. 2, 2004.

STATEMENT REGARDING FEDERALLY SPONSORED RESEARCH OR DEVELOPMENT

Not applicable.

BACKGROUND OF THE INVENTION

This invention is in the field of data communications, and is more specifically directed to power spectrum control for discrete multitone modulation communications.

Digital Subscriber Line (DSL) technology has become one of the primary technologies in the deployment of high-speed Internet access in the United States and around the world. As is well known in the art, DSL communications are carried out between a central office (CO) location, operated by a telephone company or an Internet service provider, and individual subscribers, using existing telephone "wire" facilities. Typically, some if not all of the length of the loop between the CO and the customer premises equipment (CPE) is implemented by conventional twisted-pair copper telephone wire. Remarkably, modern DSL technology is able to carry out extremely high data rate communications, even over reasonably long lengths (e.g., on the order of 15,000 feet) of twisted-pair wire, and without interfering with conventional voice-band telephone communications.

Modern DSL communications achieve these high data rates through the use of multicarrier modulation (MCM) techniques, also referred to as discrete multitone modulation (DMT), by way of which the data signals are modulated onto frequencies in a relatively wide frequency band (on the order of 1.1 MHz for conventional ADSL, and up to as high as 30 MHz for VDSL), residing well above the telephone voice band, and subdivided into many subchannels. The data symbols modulated onto each subchannel are encoded as points in a complex plane, according to a quadrature amplitude modulation (QAM) constellation. The number of bits per symbol for each subchannel (i.e., the "bit loading"), and thus the number of points in its QAM constellation, is determined according to the signal-to-noise ratio (SNR) at the subchannel frequency, which depends on the transmission channel noise and the signal attenuation at that frequency. For example, relatively noise-free and low attenuation subchannels may communicate data in ten-bit to fifteen-bit symbols, represented by a relatively dense QAM constellation with short distances between points in the constellation. On the other hand, noisy channels may be limited to only two or three bits per symbol, allowing a greater distance between adjacent points in the QAM constellation. High data rates are attained by assigning more bits (i.e., a more dense QAM constellation) to subchannels that have low noise levels and low signal attenuation, while subchannels with poorer SNRs can be loaded with a fewer number of bits, or none at all.

The most popular implementation of DSL is asymmetric DSL ("ADSL"), which follows a frequency-division duplexing (FDD) approach in that "downstream" communications from the telephone company central office ("CO") to customer premises equipment ("CPE") are in one frequency band of the spectrum, and "upstream" communications from the CPE to the CO are in another, non-overlapping, frequency band. For example, "downstream" communications (CO to CPE) in modern ADSL occupies 256 subchannels of 4.3125 kHz bandwidth, while upstream communications use 64 such subchannels at lower frequencies than the downstream band (but still above the voice band). ADSL can also be implemented in an echo-cancelled mode, where the downstream frequency band overlaps the upstream frequency band. However, this so-called "overlapped mode" of operation is not widely deployed. In any case, the asymmetry suggested by the acronym "ADSL" refers to the wider and higher-frequency band that is assigned to downstream communications, relative to the narrower, lower-frequency, upstream band. As a result, the ADSL downstream data rate is typically much greater than the upstream data rate, except in those cases in which the loop length is so long that the downstream frequency band becomes mostly unusable. Newer DSL technologies provide higher data rates by variations of the DMT scheme of ADSL. For example, "ADSL2+" extends the data bandwidth to 2.2 MHz using 512 subchannels, and also provides an optional mode in which the upstream data rate can be doubled. Very high bit-rate DSL ("VDSL") provides extremely high data rates via up to 4096 subchannels, at frequencies extending up to 30 MHz.

In addition to the bit loading and SNR of the subchannels, the available power for DSL transmission is a factor in the actual data rate that can be achieved. Given sufficient power, the signal strength relative to noise can be made high enough for a given subscriber loop that any reasonable data rate can be achieved. But the power levels for communication over a given subscriber loop are in fact limited, primarily because of crosstalk among subscriber loops that are carried over physically adjacent wire facilities. As known in the art, many conventional telephone wire lines are physically located within "bundles" for at least some distance over their length between the CO and the customer premises. This close physical proximity necessarily causes signal crosstalk between physically adjacent conductors in the bundle. The channel characteristics for each DSL user within a bundle thus depend not only on the signal power for that use, but also the signal power of the other users in the bundle and the crosstalk coupling of the signals from those other users. As such, the power level for DSL communications must be limited so that crosstalk among conductor pairs in a bundle can be kept within a reasonable level.

Historically, DSL systems typically consider the problem of crosstalk and power constraints as a "single-user" problem. Modern standards for DSL communication, such as the G.992.1 standard entitled "Asymmetric digital subscriber line (ADSL) transceivers", promulgated by the International Telecommunications Union, follows this assumption by enforcing a specified power spectral density (PSD) over the entire DSL frequency band for each user. This specified PSD keeps any particular subscriber loop from dominating others in the binder with excessive power, and thus enables reasonable data rates for a large number of subscribers. In addition, this "single-user" solution is easy to implement. However, the enforcing of a specified PSD keeps the overall system from maximizing data rates, by increasing the PSD levels, in those environments in which a higher PSD would not unduly degrade the signal for other users.

But recent advances in the availability of online content, and more widespread deployment of high-speed Internet access, have resulted in increasing demand for higher data rates over DSL connections. In one approach, referred to as very-high bit rate digital subscriber lines (VDSL), the higher data rate is achieved by using higher frequency bands; unfortunately, the crosstalk problem becomes even more severe at higher frequencies. And the widespread popularity of high data rate services are now becoming served through the use of optical fiber facilities for at least part of the length of many subscriber loops, and the deployment of other equipment to extend the reach of DSL service. However, optical network units (ONUs) that interface optical fiber to twisted-pair wire, and remote "DSLAMs" (Digital Subscriber Line Access Multiplexers) that move some of the CO functionality into the field, are notorious sources of additional crosstalk. Worse yet, these remote terminals (RTs) implemented as ONUs and DSLAMs give rise to a so-called "near-far" problem, in that two transmitters (the CO and an ONU, for example) are sourcing interference from different distances from one another; the nearer source of crosstalk, for a given user, will necessarily be stronger than the signal from the more remote source in the loop, thus calling into question the common distance assumption of the fixed PSD limit in conventional DSL. The competing factors of higher data rates and exacerbated crosstalk are thus exerting pressure onto other constraints of DSL technology. As mentioned above, one such constraint is the single-user assumption and the resulting specified PSD limits.

By way of further background, PSD limits on multiple user communications also appear in other technologies. For example, the management of PSD is important in mobile wireless communications, specifically cellular telephone technology. However, many of the problems faced in the mobile wireless context, such as fading signals, moving sources and receivers, and other time-varying factors, are not present in DSL systems. While the channel characteristics of DSL communications may be specific for individual loops, DSL channels do not vary significantly over time. And in contrast to mobile wireless communications, one can attain detailed channel knowledge in DSL loops, and use this knowledge in managing the spectrum.

Accordingly, it has become tempting to attempt to manage the PSD for DSL communications in order to achieve higher data rate communications in this modern context. In one approach, described in Yu et al., "Distributed Multiuser Power Control for Digital Subscriber Lines", *Journal on Selected Areas in Communications*, Vol. 20, No. 5 (IEEE; June, 2002), pp. 1105-15, the individual loops in a multi-user DSL environment negotiate power and frequency usage with one another. According to this fully distributed approach, each subscriber loop derives an optimal power allocation and data rate assignment over the subchannels for itself, considering the crosstalk from all other users as noise, and this allocation is successively applied by each of the other users, and iteratively repeated over all users, until convergence. Once this occurs, then each user's total power output is adjusted according to whether the date rate for that user has reached its target data rate; if the data rate is too low, that user increases its total power, or if a user's data rate is well above its target data rate, that user decreases its total power. The "inner loop" of power allocation and data rate assignment is then repeated by all users until convergence, followed by another iteration of total power adjustment relative to data rate. Once all users have converged on an allocation in which they each meet their target data rates, according to this approach, steady-state communications for all users can commence.

In contrast to this fully distributed approach, a centralized power management has the potential to further optimize data rates among multiple users by managing the PSD of each subscriber loop. One such centralized approach is described in Cendrillon et al., "Optimal Multi-user Spectrum Management for Digital Subscriber Lines", 2004 *IEEE International Conference on Communications*, Vol. 1 (Jun. 20-24, 2004), pp. 1-5. In this approach, the optimization problem is considered as a Lagrangian, in which a weighted sum of the data rates of two users (a subscriber of interest, and an interferer, for example) are optimized relative to one another, and in a manner that places the appropriate importance on the total power constraints of the users. The weighting factor of the data rates in the weighted sum is modified in an outer loop, with the goal of maximizing the data rate of the interferer while still achieving the target data rate for the subscriber of interest. Inner loops, within this outer loop, determine two Lagrangian multipliers that define the weight of the power constraints of the two users, given the bit loadings of each. According to this approach, a centralized spectrum management center (SMC) is responsible for setting the power spectra for all of the users within the communications network. Optimization of the system in this manner thus requires various parameters (bit loading, channel characteristics, etc.) to be communicated from each user to the SMC for these calculations.

BRIEF SUMMARY OF THE INVENTION

It is therefore an object of this invention to provide a distributed method of optimizing power spectral density in a digital subscriber line system in a manner that accounts for interfering users.

It is a further object of this invention to provide such a method in which much of the computations are effected locally.

It is a further object of this invention to provide such a method in which local computations are centrally optimized.

It is a further object of this invention to provide such a method in which the communications to and from the central optimizing function are minimized.

Other objects and advantages of this invention will be apparent to those of ordinary skill in the art having reference to the following specification together with its drawings.

The present invention may be implemented into a digital subscriber line (DSL) system in which each DSL loop in the network optimizes its power spectral density while accounting for crosstalk from other users and loops, including those of differing distances (source to destination). The optimization method is based on maximizing the data rate of an interfering user upon a given user, subject to a constraint that the given user data rate must meet its target data rate. This maximizing process is decomposed into two optimization problems, one that can be solved at the given user and one that can be solved at the interfering user. A weighting factor, or Lagrangian multiplier, is adjusted based on a comparison of whether the power spectral density of the interfering user exceeds a maximum tolerable level at the given user; this comparison is effected at a network management center, and the resulting adjustment in the weighting factor is communicated to the two users.

BRIEF DESCRIPTION OF THE SEVERAL VIEWS OF THE DRAWING

FIG. 1 is an electrical diagram, in block form, of a digital subscriber line (DSL) system incorporating the preferred embodiment of the invention.

FIG. 2 is an electrical diagram, in block form, of the construction of a DSL modem according to the preferred embodiment of the invention.

FIG. 3 is a data flow diagram illustrating DSL communications, in one direction by way of example, according to the preferred embodiment of the invention.

FIG. 5 is an electrical diagram, in block form, illustrating a DSL system operating according to the preferred embodiment of the invention.

FIGS. 7 and 8 are flow diagrams illustrating the operation of a central office DSL modem in maximizing the power spectral density of an interfering user, for a given target data rate from the central office, in the spectrum management method of FIG. 6 according to the preferred embodiment of the invention.

DETAILED DESCRIPTION OF THE INVENTION

Figure 4A:
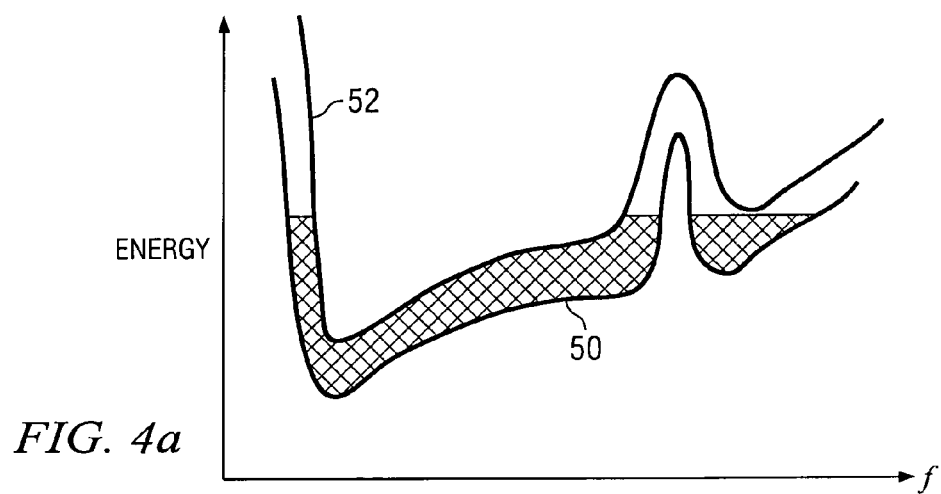
FIG. 4a is a plot of energy versus frequency illustrating one of the optimization problems for assigning data rate and power spectrum according to the preferred embodiment of the invention.

The present invention will be described in connection with its preferred embodiment, namely as implemented into a multi-user digital subscriber line (DSL) system in which discrete multitone (DMT) modulated communications are carried out between subscribers and a central office (CO), and also between subscribers and remote terminals (RT), such as optical network units (ONUs) or remote digital subscriber line access multiplexers (DSLAMs). However, it is contemplated that this invention may also be applicable to a wide range of other types of networks, especially those in which crosstalk among users is a limitation on data rate. Accordingly, it is to be understood that the following description is provided by way of example only, and is not intended to limit the true scope of this invention as claimed.

FIG. 1 illustrates an example of a DSL network into which the preferred embodiment of the invention is implemented, illustrating two "users", or subscriber loops, by way of example. It will of course be understood by those skilled in the art having reference to this specification that many such subscriber loops and users will be present and operable in a modern DSL network. As fundamental in this art, DSL networks typically involve a large number of subscribers within a given geographical area, all being served by the Public Switched Telephone Network (PSTN) infrastructure, including existing twisted-pair wire facilities, optical fiber networks, central office switching gear, and the like. As such, it is contemplated that there are typically hundreds of DSL loops connected and operable within a reasonably sized geographic at any given time. The extension of this preferred embodiment of the invention from the two user scenario of FIG. 1 to a typical real-world realization will be described below; however, for purposes of this description, the two user situation of FIG. 1 will fully illustrate the preferred embodiment of the invention.

The exemplary network of FIG. 1 is a relatively modern network, and as such users within the same network need not all communicate to and from the same central office. In this example, central office (CO) 10 serves one instance of customer premises equipment ($12_1$) by way of a subscriber loop LP1. Subscriber loop LP1 is, of course, a bidirectional digital subscriber line connection, and as such data is communicated "downstream" from CO 10 to CPE $12_1$, as well as "upstream" from CPE $12_1$ to CO 10. This bidirectional communication is typically effected by frequency-division duplex (FDD) techniques, and utilizing a broadband modulation scheme such as discrete multitone modulation (DMT). In the "asymmetric" DSL (ADSL) case, the upstream traffic is carried by sixty-four subchannels, each 4.3125 kHz in bandwidth, while the downstream traffic is communicated over 256 subchannels of that bandwidth. This asymmetry is tolerated in conventional DSL services because of the lopsided demand for downstream data capacity relative to upstream capacity. As mentioned above, ADSL2+ uses 512 downstream subchannels, while VDSL uses up to 4096 subchannels. An alternative bidirectional DSL scheme, for example as used in Japan, is a time-division duplex (TDD) scheme in which non-overlapping time periods are dedicated to upstream and downstream communications, respectively. For purposes of this description, the preferred embodiment of the invention will be described as derived for and applied to downstream communications, because the downstream channels are at higher frequency and have higher data rate demand than the upstream channels, particularly in the FDD context.

In this modem DSL system, another subscriber or user consists of remote terminal (RT) 15 and second CPE $12_2$, bidirectionally communicating over loop LP2 as shown in FIG. 1. As mentioned above, many modem DSL systems are now using optical fiber ("fiber optic") cabling for long distance signal communication; as known in the art, the attenuation losses and signal crosstalk within fiber optic binders is relatively minimal, and as such the available data rates that can be communicated over optical fiber are very high. In a fiber optic system, RT 15 may correspond to an optical network unit (ONU), which provides the physical and electrical interface between the fiber optic facility and conventional twisted-pair copper wire over which DSL communications are carried. In this case, RT 15 will not be deployed at the same location as CO 10, but may instead be placed in the field, much closer to the subscribers CPE $12_1$, $12_2$. For example, the ONU may be located at the neighborhood of a number of subscribers. Another class of remote terminals from which RT 15 may be implemented includes remote Digital Subscriber Line Access Multiplexers (DSLAMs), also located in the field, away from the central office. In either the ONU or the DSLAM case, RT 15 serves in the same function as "central office" CO 10, specifically as the source of downstream DSL communications to, and an (intermediate) destination of upstream DSL communications from, CPE $12_2$ over loop LP2 in this example. And in any case, RT 15 can be connected to a central office through a fiber optic facility, twisted pair copper wire, or any other medium having sufficient transport capacity.

As shown in FIG. 1, the DSL system according to this embodiment of the invention also includes network management center (NMC) 20, which is bidirectionally connected to each of CO 10 and RT 15. Each of CO 10 and RT 15 are also connected (typically through other switching and routing equipment, not shown for clarity) to a wide area network such as the Internet. NMC 20 in this example is shown as separate and independent from the main upstream data paths to the Internet, to indicate that the payload data need not necessarily travel through or be handled by NMC 20. Typically, the "connection" of NMC 20 to CO 10 and RT 15 will be through an overhead or control channel that physically uses the same conductors as the payload data to and from the wide area network.

Also in this exemplary DSL system as shown in FIG. 1, loops LP1, LP2 are implemented in twisted-pair wire conductors that, for at least some distance along their lengths, reside in the same wire "binder" or "binder group" as one another. As known in the art, a "binder" refers to a collection of twisted wire pairs that share a common physical "sheath." Because of the proximity of wires sharing the sheath, conventional communication services carried out over the wires within a binder group are vulnerable to crosstalk and other interference among the corresponding users.

According to this preferred embodiment of the invention, CO 10, RT 15, and CPE 12$_1$, 12$_2$ may be constructed in the conventional manner. Typically, each of CO 10, RT 15, and CPE 12$_1$, 12$_2$ are constructed as, or include, a DSL modulator/demodulators ("modems"). A generalized DSL modem 30, based upon which CO 12, RT 15, and CPE 12 are each constructed, is illustrated in FIG. 2 for purposes of this description. DSL modem 30 is effectively a transceiver, in the sense that it can both transmit and receive signals over the communications facility, which in this case is twisted-pair LP. The particular details such as modulation and demodulation carried according to their particular location (i.e., whether as CO or RT equipment, or as CPE).

DSL modem 30 includes hybrid circuit 22, which is connected to twisted-pair LP, and which is a conventional circuit that converts the two-wire arrangement of the twisted-pair facility to dedicated transmit and receive lines connected to line driver and receiver 24, considering that bidirectional signals are communicated over twisted-pair LP by DSL modem 30. Line driver and receiver 24 is a high-speed line driver and receiver for driving and receiving ADSL signals over twisted-pair lines; an example of line driver and receiver 24 is the THS7102 line driver/receiver available from Texas Instruments Incorporated. Line driver and receiver 24 is bidirectionally coupled to coder/decoder ("codec") circuit 26, which carries out analog filtering, analog-to-digital conversion, and some amount of digital filtering, as conventional for DSL modems in the art. According to the preferred embodiment of the invention, in which the ADSL communications are carried out according to a frequency division duplexing (FDD) scheme as mentioned above, codec circuit 26 filters the incoming (e.g., upstream, in the case of CO 10 or RT 15) signal to eliminate any interference from the (downstream) signals that it is transmitting. An example of a suitable codec device may be selected from the TLV320AD1x device family available from Texas Instruments Incorporated. Hybrid circuit 22, line driver and receiver 24, and codec 26 are often referred to, in the aggregate, as an "analog front end".

In this example, DSL modem 30 also includes digital signal processor (DSP) 25, which serves as a digital transceiver for DSL communications. Alternatively, DSL modem 30 may include multiple processors, either general purpose processors or DSPs, or a combination of the two; further in the alternative, the digital transceiver of DSL modem 30 may be based on dedicated application-specific circuitry for performing the necessary signal processing operations, embodied in one or more physical devices. As noted above, DSP 25 is a high performance digital signal processor, for carrying out digital operations in response to program instructions. These digital operations include the encoding of the discrete multitone (DMT) modulated subchannels, for example according to the G.992.1 ADSL standard. Exemplary devices suitable for use as DSP 25 include DSPs having computational power similar to or greater than the TMS320c5x and TMS320c6x DSPs available from Texas Instruments Incorporated. A conventional host interface 28 couples DSP 25 to a computer workstation, or to some other network element, such as a router or switch, etc., depending on the location of DSL modem 30 and its particular network configuration.

An example of a chipset suitable for implementing DSL modem 30, in either CO 10 or RT 15, is the AC5 central office ADSL chipset available from Texas Instruments Incorporated, programmed to perform the particular operations described in this specification. When realized as CPE 12, DSL modem 30 may be realized by a conventional chipset, a preferred example of which is the AR7 ADSL router and residential gateway chipset solution available from Texas Instruments Incorporated.

FIG. 3 illustrates the data flow in DSL communications, for a given direction (e.g., downstream, from CO 10 or RT 15 to CPE 12). The input bitstream that is to be transmitted, typically a serial stream of binary digits in the format as produced by the data source, is applied to bit-to-symbol encoder 31 in the transmitting modem 30. Encoder 31 groups the bits in the input bitstream into multiple-bit symbols that are used to modulate the DMT subchannels, with the number of bits in each symbol determined according to the bit loading assigned to its corresponding subchannel, based on the characteristics of the transmission channel LP as mentioned above. Encoder 31 may also apply error correction coding, such as Reed-Solomon coding, for error detection and correction purposes; other types of coding, such as trellis, turbo, or LDPC coding, may also be applied for additional signal-to-noise ratio improvement. The symbols generated by encoder 31 are typically complex symbols, including both amplitude and phase information, and correspond to points in the appropriate modulation constellation (e.g., QAM). Each symbol is associated with one of the DMT subchannels.

The encoded symbols are then applied to inverse Discrete Fourier Transform (IDFT) (for the sake of performance, preferably implemented as an Inverse Fast Fourier Transform (IFFT)), function 32, which associates each symbol with one subchannel in the transmission frequency band, and generates a corresponding number of time domain symbol samples according to the Fourier transform. These time domain symbol samples are then converted into a serial stream of samples by parallel-to-serial converter 33. This serial sequence of symbol values is representative of the sum of a number of modulated subchannel carrier frequencies, with the modulation indicative of the various data values. Typically, N/2 unique complex symbols (and its N/2 conjugate symmetric symbols) in the frequency domain will be transformed by IDFT function 32 into a block of N real-valued time domain samples.

As known in the art, cyclic insertion function 34 adds a cyclic prefix or suffix, or both, to each block of serial samples presented by parallel-to-serial converter 33. In conventional ADSL, cyclic insertion function 34 prepends a selected number of sample values from the end of the block to the beginning of the block. In ADSL2+ and VDSL, cyclic prefix and suffix insertion, and transmitter windowing, are combined into a single module, such as cyclic insertion function 34 of FIG. 3. In any case, cyclic insertion has the effect of limiting intersymbol interference (ISI) due to energy from a previous symbol spreading into the next symbol due to the channel response, by causing the datastream to appear to be periodic over a block of N of the N+P samples, where P is the length of the cyclic insertion, so that the equivalence between frequency domain multiplication and time-domain convolution is valid. Upsampling function 35 and digital filter function 36 then process the digital datastream in the conventional manner. As known in the art, upsampling function doubles or quadruples (or applies any multiple) the datastream to increase the sample rate, by inserting zero-value samples between each actual signal sample. Digital filter 36 may include such operations as a digital low pass filter for removing image components, and digital high pass filtering to eliminate voice band or ISDN interference. The digital functions corresponding to encoder 31 through digital filter function 36 of FIG. 3 may be performed by DSP 25 of modem 30, as shown in FIG. 2.

Referring back to FIG. 3, digitally-filtered datastream signal is then converted into the analog domain by digital-to-analog converter 37. Analog filtering (not shown) may then be performed on the output analog signal, such filtering typically including at least a low-pass filter. The analog signal is then amplified by amplifier 38 which, according to this embodiment of the invention, includes a clipping function, such as a hardlimiting clipping function that limits the amplitude to a maximum (both positive and negative polarities). Digital-to-analog converter 37, amplifier 38, and any analog filtering, may be implemented in the analog front end of codec 26, line driver and receiver 24, and hybrid circuit 22, as shown in DSL modem 10 of FIG. 2.

The amplified analog output is then applied to transmission channel LP for communication over some length of conventional twisted-pair wires to a receiving DSL modem, which, in general, reverses the processes performed by the transmitting modem to recover the input bitstream as the transmitted communication following physical receipt of the signal through a corresponding hybrid circuit 22 and line driver and receiver 24 at a receiving DSL modem, which may be constructed according to the example of FIG. 2. In the example of FIG. 3, analog filtering function 41 removes high frequency noise and aliasing from the incoming signal. Equalization of the analog signal may also be performed to compensate for line attenuation characteristics of transmission channel LP. Analog-to-digital conversion 42 then converts the filtered analog signal into the digital domain, following which conventional digital filtering function 43 is applied to augment the function of the analog filters. In the exemplary construction of FIG. 2, functions 41, 42, and 43 are preferably performed by the receiver side of line driver and receiver 24, to provide a filtered digital data stream to DSP 25 for digital processing via codec 26, as will now be described, with reference to FIG. 3.

Digital filter function 43 forwards the filtered digital datastream to time domain equalizer (TEQ) 44. TEQ 44 is preferably a finite impulse response (FIR) digital filter, implemented as a software routine executed by DSP 25, that is designed to effectively shorten the length of the impulse response of the transmission channel LP, including the filtering that is performed prior to receipt by TEQ 34. The design of this TEQ filter is realized by the selection of the particular coefficients of the FIR implementing TEQ function 44 during initialization, or "training" of the DSL modems upon establishing a communications session. Following TEQ 44, the cyclic prefix is removed from each received block in function 45. Serial-to-parallel converter 46 then converts the datastream into a number of samples (2N) for application to Discrete Fourier Transform (DFT) function 47. Because the received datastream applied to DFT function 47 is a time-domain superposition of the modulated subchannels, the DFT of this datastream will recover the modulating symbols at each of the subchannel frequencies, reversing the IDFT performed by function 32 in transmission. The output of DFT function 47 is a frequency domain representation of the transmitted symbols multiplied by the frequency-domain response of the effective transmission channel, under the assumption that the cyclic prefix is at least as long as the (possibly shortened) impulse response of the channel, as known in the art. Frequency-domain equalization (FEQ) function 48 then divides out the frequency-domain response of the effective channel, recovering the modulating symbols. Symbol-to-bit decoder function 49 then resequences the symbols into a serial bitstream, decoding any encoding that was applied in the transmission of the signal, and producing an output bitstream that corresponds to the input bitstream upon which the transmission was based. This output bitstream is then forwarded to the client workstation, or to the central office network, as appropriate for the location.

Referring back to FIG. 1, various transfer functions H describe the effects of the communications channels along and between loops LP1, LP2 in this example, on the transmitted DMT signals. The frequency-dependent channel function $H_{11}$ corresponds to the characteristics of the downstream subchannels along loop LP1 from CO 10 to CPE $12_1$; similarly, frequency-dependent channel function $H_{22}$ describes the characteristics of the subchannels along loop LP2 from RT 15 to CPE $12_2$. As mentioned above, particularly because of the sharing of a binder by loops LP1, LP2, signal energy in each loop LP1, LP2 couples to the other as cross-talk. As such, one can derive transfer functions for this crosstalk coupling. In FIG. 1, transfer function $H_{21}$ is the frequency-dependent transfer function for the coupling of energy sourced by RT 15 (on loop LP2) to loop LP1, and conversely, frequency-dependent transfer function $H_{12}$ refers to the coupling of energy sourced by CO 10 (on loop LP1) to loop LP2. It is evident from this Figure that the crosstalk coupling is in the nature of "far end" crosstalk, or "FEXT", as it refers to the coupling of noise from a distant, unrelated, transmitter onto signal energy from the intended transmitter. So-called "near end" crosstalk ("NEXT"), referring to the coupling of energy transmitted from the same end of the conductor into the received energy at that end, can be ignored in this case because of the FDD (or TDD) separation of upstream and downstream signals from one another.

As mentioned above, RT 15 is typically much closer, physically, to CPE $12_1$ and CPE $12_2$ than is CO 10. Accordingly, the crosstalk coupling from loop LP2 to loop LP1 via transfer function $H_{21}$ will be significantly stronger than the crosstalk coupled from loop LP1 to loop LP2 via transfer function $H_{12}$. In other words, signals sourced by CO 10 on loop LP1 will couple more weakly to loop LP2 than the signals sourced by RT 15 are coupled to loop LP1. This asymmetric crosstalk is taken advantage of by this invention, in defining the power spectral density (PSD) constraints on the signals transmitted by CO 10 and RT 15, as will be apparent from the following description.

According to this preferred embodiment of the invention, the PSD of each transmitter in the system, namely CO 10 and RT 15 in the example of FIG. 1, is optimized by calculations carried out at CO 10 and RT 15 themselves, for example by programmable digital circuitry such as DSP 25 deployed within modem 30 at each location. Only minimal communication to and from, and assistance by, network management center 20 is required according to the preferred embodiment of the invention, in order to maximize the data rates of the transmissions from CO 10 and RT 15, while considering the effects of crosstalk between the loops. For better understanding of this invention, the theory of its operation will now be described, following which an example of the implementation of this invention according to a preferred embodiment will then be described.

Theory of Operation

According to the preferred embodiment of the invention, the management of the PSD for each of the users in the multi-user DSL system is considered as a two-user problem. Of course, as mentioned above, many more than two users will be operating in typical DSL systems; these multiple users are preferably handled by dividing them into two groups of users, considering that multiple users are sourced by each central office location (e.g., CO 10) and each remote terminal (e.g., RT 15). Accordingly, those skilled in the art having reference to this specification will be readily able to derive the respective PSDs for the typical multi-user arrangement by extending this two-user problem to groups of users.

Referring to FIG. 1, user 1 will be considered as the subscriber loop of CO 10 and CPE 12$_1$, over loop LP1, and user 2 will be considered as the subscriber loop of RT 15 and CPE 12$_2$ over loop LP2. According to the preferred embodiment of the invention, an optimization problem is defined as the maximizing of the data rate $R_2$ for user 2 over the possible PSDs for users 1 and 2, expressed tone-by-tone as $s_{1,n}$ and $s_{2,n}$ (the value $S_{j,k}$ being the power level of user j on tone k of the DMT modulation):

$$\max_{s_{1,n}, s_{2,n}} R_2 \tag{1a}$$

subject to the constraint of user 1 meeting a target data rate $R_{target}$:

$$R_1 \geq R_{target} \tag{1b}$$

and subject to overall power limit constraints:

$$\sum s_{1,n} \leq P_1, \sum s_{2,n} \leq P_2 \tag{1c}$$

where $P_j$ is the overall power limit for a given user j. This maximization problem is effectively equivalent to a weighted data rate objective for DSL channels generally, in which certain power constraints (the PSD) are applied to each user, and in which the data rate of an interferer (user 2) is maximized to the highest tolerable level by user 1 (i.e., while still achieving the target data rate for user 1.

The problem addressed by this embodiment of the invention amounts to a so-called "near-far" problem, as illustrated in FIG. 1. In this type of problem, the interferer (RT 15) is closer to the destination of the interfered—with transmission (CPE 12$_1$, over loop LP1) than vice versa. As such, one can validly assume that there will be more interference on loop LP1 from loop LP2 than interference on loop LP2 from loop LP1, such that, from a crosstalk interference standpoint, the interference to user 2 caused by user 1 is insignificant relative to the interference caused to user 1 by user 2. Accordingly, one can express the data rates $R_1$ and $R_2$ for users 1 and 2, respectively, as:

$$R_1 = \sum \log_2\left[1 + \frac{s_{1,n}}{(\alpha_n s_{2,n} + \sigma_{1,n}^2)}\right] \tag{2a}$$

$$R_2 = \sum \log_2\left(1 + \frac{s_{2,n}}{\sigma_{2,n}^2}\right) \tag{2b}$$

where $\sigma^2_{j,n}$ is the amplitude of channel noise for tone n of user j, and where $\alpha_n$ is a coupling factor for tone n. Equations (2a) and (2b) show the underlying assumption that crosstalk from user 2 couples into, and degrades, the data rate $R_1$ of user 1, by way of the $\alpha_n s_{2,n}$ term in equation (2a) but that crosstalk from user 1 does not affect the data rate $R_2$.

And by expressing the target data rate $R_{target}$ as a sum of the bit loadings $b_{1,n}$ over the n tones of the DMT downstream band, for user 1:

$$R_{target} = \sum b_{1,n} \tag{3a}$$

according to this embodiment of the invention, one then can express the user 1 data rate constraint of equation (1b) for a given tone n, in terms of this bit loading:

$$\log_2\left[1 + \frac{s_{1,n}}{(\alpha_n s_{2,n} + \sigma_{1,n}^2)}\right] \geq b_{1,n} \tag{3b}$$

The maximum allowed, or tolerable, power of user 2 on tone n as s'$_{2,n}$ can be defined as that level of power at user 2 that still permits the user 1 data rate $R_1$ to meet its target data rate $R_{target}$. Substituting this tolerable user 2 power s'$_{2,n}$ into equation (3b), and solving for tolerable power s'$_{2,n}$:

$$s'_{2,n} = \frac{s_{1,n}}{\alpha_n(2^{b_{1,n}} - 1)} - \frac{\sigma_{1,n}^2}{\alpha_n} \tag{4}$$

Equation (4) thus transforms the rate constraint, at user 1 as expressed in equations (3a) and (3b), into a power spectral density restriction for interfering user 2.

A primal data rate optimization problem, for data rate $R_2$, can now be considered:

$$\max_{s_{1,n}, s_{2,n}, b_{1,n}} \sum \log_2\left(1 + \frac{s_{2,n}}{\sigma_{2,n}^2}\right) \tag{5a}$$

subject to the power constraint of:

$$s_{2,n} \leq s'_{2,n} = \frac{s_{1,n}}{\alpha_n(2^{b_{1,n}} - 1)} - \frac{\sigma_{1,n}^2}{\alpha_n} \tag{5b}$$

using equation (4). In effect, the problem of equation (5a) is to maximize the data rate $R_2$ over the PSDs $s_{1,n}$ and $s_{2,n}$ and over the user 1 bit loading $b_{1,n}$, subject to the tolerable power s'$_{2,n}$ to ensure that user 1 achieves its target data rate $R_{target}$.

Given this primal, one-user, problem of equations (5a) and (5b), the dual, two-user, problem becomes:

$$\min_{\lambda_n}\left\{\max_{s_{1,n}, s_{2,n}, b_{2,n}} \sum \log_2\left(1 + \frac{s_{2,n}}{\sigma_{2,n}^2}\right) - \sum \lambda_n(s_{2,n} - s'_{2,n})\right\} \tag{6a}$$

subject to the constraint of:

$$\lambda_n \geq 0 \tag{6b}$$

where $\lambda_n$ is a Lagrangian multiplier, or weighting factor, which controls the effect of the user 2 power constraint on the optimization for each of the n tones. This dual problem is thus the minimizing, over non-negative values of the Lagrangian multiplier $\lambda_n$, of the maximum difference between the user 2 data rate $R_2$ and the weighted difference, over tones n, of user 2 power and the tolerable user 2 power, maximized over the PSDs $s_{2,n}$ and $s_{1,n}$ and over the user 1 bit loading $b_{1,n}$. Equation (6a) is thus in the form of a Lagrangian function, over the variables $\lambda_n$, $s_{1,n}$, $s_{2,n}$, and $b_{1,n}$.

It has been discovered, according to this invention, that this Lagrangian problem can be decomposed into two terms, one term involving parameters pertaining to user 1 and not user 2, and the other term involving parameters pertaining to user 2 and not user 1; a shared term, namely the Lagrangian multiplier $\lambda_n$, is involved in both terms. This decomposition permits the distribution of the optimization problem to the two users in the DSL system, requiring only coordination and adjustment of the Lagrangian multiplier $\lambda_n$ between the two users, for example from a central authority such as network management center (NMC) 20 of FIG. 1.

The decomposition of the Lagrangian function of equation (6a), according to the preferred embodiment of the invention, is derived:

$$L = \sum \log_2\left(1 + \frac{s_{2,n}}{\sigma_{2,n}^2}\right) - \sum \lambda_n(s_{2,n} - s'_{2,n}) \quad (7)$$

$$= \left[\sum \log_2\left(1 + \frac{s_{2,n}}{\sigma_{s,n}^2}\right) - \sum \lambda_n s_{2,n}\right] + \sum \lambda_n s'_{2,n}$$

$$= L_1(\lambda_n, s_{2,n}) + L_2(\lambda_n, s_{1,n}, b_{1,n})$$

considering that the tolerable power constraint $s'_{2,n}$ in Lagrangian $L_2$ is a function of the PSD $s_{1,n}$ and bit loading $b_{1,n}$, as expressed in equation (5b). Accordingly, for a given value of Lagrangian multiplier $\lambda_n$, the maximization problems $L_1$, $L_2$ can be individually solved, independently from one another.

Lagrangian function $L_1$:

$$L_1(\lambda_n, s_{2,n}) = \sum \log_2\left(1 + \frac{s_{2,n}}{\sigma_{s,n}^2}\right) - \sum \lambda_n s_{2,n} \quad (8)$$

is solvable using only parameters from user 2, in combination with the Lagrangian multiplier $\lambda_n$, which is the effective "price" of power on each tone n. This Lagrangian corresponds to the maximization problem $$\max_{s_{2,n}} \sum \log_2\left(1 + \frac{s_{2,n}}{\sigma_{s,n}^2}\right) - \sum \lambda_n s_{2,n} \quad (9a)$$

over possible values of PSD $s_{2,n}$, and subject to the constraint of $$\sum s_{2,n} \leq P_2 \quad (9b)$$

The solution of this maximization problem is equivalent to the well-known "waterfilling" problem in DSL initialization, subject to a PSD constraint. FIG. 4a graphically illustrates this approach.

Curve 50 of FIG. 4a corresponds to the familiar plot of energy versus frequency, based on the so-called SNR "gap" in DMT transmission theory. The SNR gap ($\Gamma$) is a measure, for a given encoding and modulation approach, of the effective loss of signal-to-noise ratio with respect to channel capacity. Curve 50 of FIG. 4 corresponds to the product of the SNR gap $\Gamma$ with the ratio of the noise power spectrum N(f) to the channel transfer function H(f):

$$\Gamma \frac{N(f)}{H(f)} \quad (10a)$$

The allocated signal energy is then added to the energy floor defined by curve 50 on a tone-by-tone basis, subject to the power constraint of the system. In this example, as shown in FIG. 4a, curve 52 illustrates this power constraint, which for user 2 is the tone-by-tone PSD(f) added to curve 50:

$$PSD(f) + \Gamma \frac{N(f)}{H(f)} \quad (10b)$$

Examples of conventional waterfilling techniques for allocating energy to tones of a DMT spectrum, suitable for the allocation of energy to user 2 according to this preferred embodiment of the invention, are described in Starr et al., *Understanding Digital Subscriber Line Technology* (Prentice Hall, 1999), pp. 208-217, and in U.S. Pat. No. 5,479,447, incorporated herein by this reference. The filled region of FIG. 4a illustrates an exemplary allocation of signal energy for user 2. Again, as mentioned above relative to equation (9a), this allocation is performed for a given value of Lagrangian multiplier $\lambda_n$.

Meanwhile, user 1 is also solving Lagrangian $L_2$, as a function of its PSD $s_{1,n}$ and bit loading $b_{1,n}$, and for this given value of Lagrangian multiplier $\lambda_n$. In effect, this Lagrangian $L_2$ problem amounts to the maximization:

$$\max_{s_{1,n}, s'_{2,n}} \sum \lambda_n s'_{2,n} \quad (11a)$$

subject to the user 1 data rate target constraint $$\sum \log_2\left[1 + \frac{s_{1,n}}{(\alpha_n s'_{2,n} + \sigma_{1,n}^2)}\right] = R_{target} \quad (11b)$$

and to the power constraints:

$$s_{1,n} \leq P_1 \quad (11c)$$

$$s'_{2,n} \leq P_{2,n} \quad (11d)$$

In effect, the solving of Lagrangian $L_2$ maximizes the crosstalk from user 2, for given tone-by-tone values of Lagrangian multiplier $\lambda_n$, that can be tolerated by user 1, where the toleration of this crosstalk is defined by the user 1 target data rate $R_{target}$ as expressed in equation (11b). The tone-by-tone Lagrangian multiplier $\lambda_n$ is a weighting factor of this crosstalk across frequency. It has been observed, according to this invention, that Lagrangian $L_2$ is a non-convex problem, but also that sub-optimal algorithms are effective in realizing workable solutions.

Figure 4B:
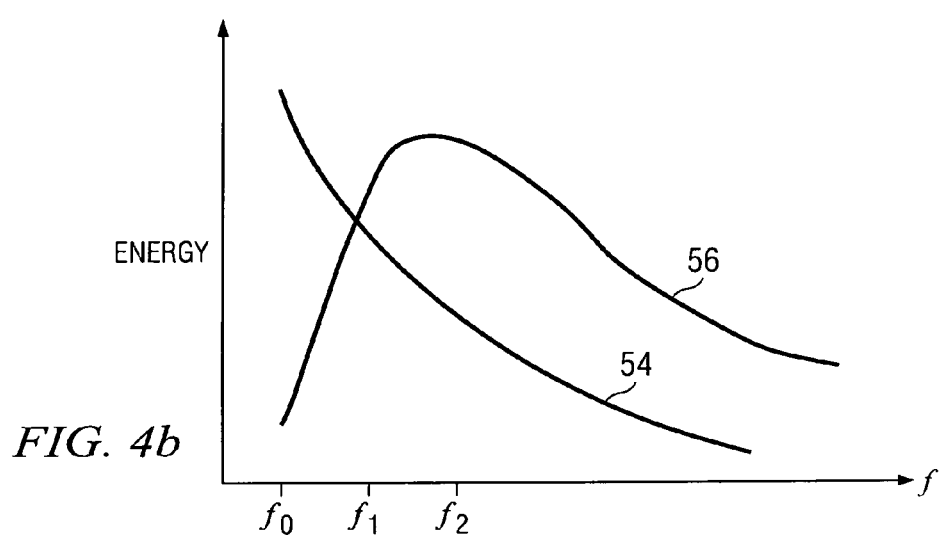
FIGS. 4b and 4c are plots of energy versus frequency illustrating a second optimization problem for assigning data rate and power spectrum according to the preferred embodiment of the invention.
Figure 4C:
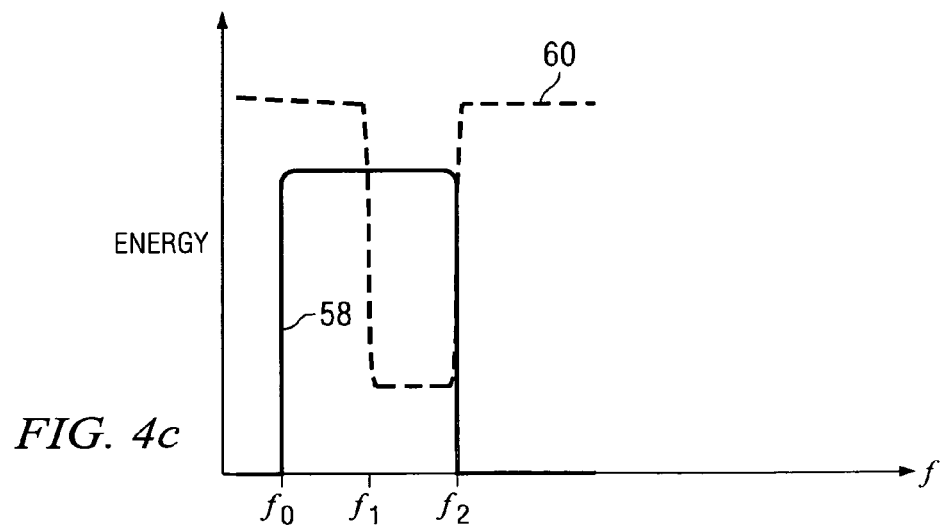

These suboptimal solutions can be illustrated relative to FIGS. 4b and 4c. In FIG. 4b, curve 54 illustrates a typical channel response spectrum for a DSL user, illustrating that the transmitted signal energy falls off with frequency (i.e., there is less attenuation at lower signal frequencies than at higher frequencies). Curve 56 illustrates a typical spectrum of crosstalk energy from user 2 as seen at user 1, for a given power level $P_2$; in this example, crosstalk at lower frequencies (and also at higher frequencies) couples relatively poorly, but couples well at middle frequencies of the illustrated frequency range.

By analyzing FIG. 4b, one can derive, for user 1, a power spectrum (PSD) $s_{1,n}$ that achieves the target data rate $R_{target}$ while avoiding heavy coupling of crosstalk from user 2. This spectrum is illustrated by curve 58 in FIG. 4c, which illustrates an example of PSD $s_{1,n}$. As shown by curve 58, PSD $s_{1,n}$ is zero for tones n at frequencies below frequency $f_0$ and above frequency $f_2$, and at a maximum level between frequency $f_0$ and frequency $f_2$. Curve 60, on the other hand, corresponds to the maximum tolerable PSD $s'_{2,n}$ for user 2, and is established as having high energy up to frequency $f_1$, minimum energy between frequency $f_1$ and frequency $f_2$, and is permitted maximum energy for frequencies beyond frequency $f_2$.

The tones n between frequency $f_0$ and frequency $f_1$, for which high energy levels are permitted for both of users 1 and 2 (curves 58 and 60 are both at high levels) correspond to those frequencies for which the channel of user 1 has relatively low attenuation (see curve 54 of FIG. 4b) and for which relatively low coupling of crosstalk from user 2 occurs (see curve 56 of FIG. 4b). As such, significant signal energy can be transmitted by user 1 on these tones. User 1 can also transmit significant energy on tones n between frequency $f_1$ and frequency $f_2$, because the channel also transmits signals reasonably well at these frequencies (see curve 54 of FIG. 4b), and because the permitted power from user 2 at these frequencies is minimized for tones n between frequency $f_1$ and frequency $f_2$, as evident from curve 60. In effect, the high crosstalk coupling from user 2 at frequencies between frequency $f_1$ and frequency $f_2$ is addressed by the minimizing of the permitted tolerable PSD $s'_{2,n}$ for these tones. At frequencies beyond frequency $f_2$, user 2 is permitted significant energy as shown by curve 60, and no signal energy is applied by user 1, because both the attenuation of the user 1 channel is high and the crosstalk coupling from user 2 is relatively high at these frequencies. In effect, the target data rate $R_{target}$ is approached by widening the width of curves 58, 60 between frequency $f_1$ and frequency $f_2$. This effectively defines the permitted tolerable PSD $s'_{2,n}$ for user 2.

The balancing of the actual PSD $s_{2,n}$ at user 2 against the tolerable PSD $s'_{2,n}$ is accomplished by adjusting the Lagrangian multiplier $\lambda_n$. This adjustment effects the minimization:

$$\min_{\lambda_n}\left[\max_{s_{2,n}} L_1 + \max_{s_{1,n}, s'_{2,n}} L_2\right] \quad (12a)$$

subject to the constraint:

$$\lambda_n \geq 0 \quad (12b)$$

It has been observed that this objective problem of equations (12a) and (12b) is convex over $\lambda_n$. According to this preferred embodiment of the invention, the adjustment of Lagrangian multiplier $\lambda_n$ can be made in response to a comparison of the tolerable PSD $s'_{2,n}$ as derived by user 1 in its maximization of Lagrangian $L_2$ with the actual PSD $s_{2,n}$ derived by user 2 in its maximization of Lagrangian $L_1$. Specifically, if the actual PSD $s_{2,n}$ derived by user 2 is greater than the tolerable PSD $s'_{2,n}$ at user 1, Lagrangian multiplier $\lambda_n$ is increased to reduce the actual power at user 2. Conversely, if the tolerable PSD $s'_{2,n}$ at user 1 is greater than the actual PSD $s_{2,n}$ derived by user 2, Lagrangian multiplier $\lambda_n$ is decreased to increase the actual power at user 2 and thus increase its data rate. After the adjustment of the Lagrangian multiplier $\lambda_n$, the Lagrangians $L_1$ and $L_2$ can again be maximized for the new given value of $\lambda_n$, after which the comparison of the tolerable PSD $s'_{2,n}$ with the actual PSD $s_{2,n}$ can again be made, and further adjustment of Lagrangian multiplier $\lambda_n$ effected. Upon convergence of tolerable PSD $s'_{2,n}$ and the actual PSD $s_{2,n}$, because of the convex nature of the objective function of equation (12a), the data rates for both of users 1 and 2 are maximized.

Exemplary Implementation

Figure 6:
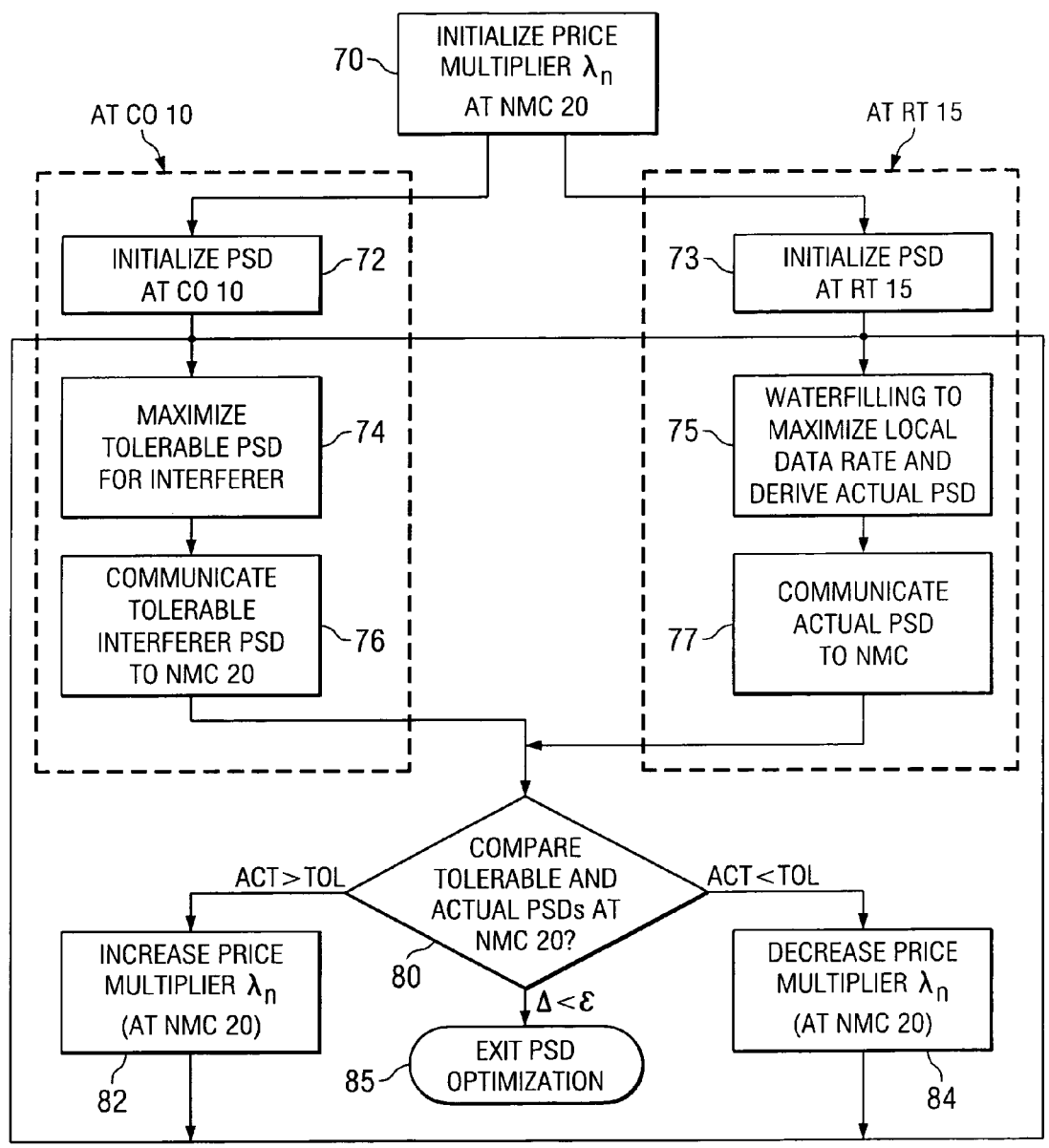
FIG. 6 is a flow diagram illustrating the operation of the spectrum management method according to the preferred embodiment of the invention.

Referring now to FIGS. 5 and 6, the implementation of a preferred embodiment of the invention into a DSL system will now be described in detail. More specifically, the implementation of this embodiment of the invention will be described in connection with the two-user system of FIG. 1, by way of example. As mentioned above, those skilled in the art having reference to this specification will be readily able to adapt this preferred embodiment of the invention to a multi-user system by considering the power control optimization problem as two groups of users, considering users served by a central office as one group, and those served by a remote terminal installation as another group. The relative PSDs derived according to this embodiment of the invention can be assigned on a group-wide basis to these groups of DSL users.

As shown in FIG. 5, CO 10 is establishing a DSL subscriber loop communication session with CPE $12_1$, over twisted-pair wire conductors illustrated as loop LP1 in FIG. 5. As described above, this communications session is bidirectional; in this example, in which the communications follow the well-known ADSL standard, this description will concentrate on the downstream communications (CO 10 to CPE $12_1$) because crosstalk dominates the higher ADSL downstream frequencies, relative to the lower upstream frequencies. Also as shown in FIG. 5, RT 15 is establishing a DSL session with CPE $12_2$ over twisted-pair wire conductors of loop LP2. In this example, as described above, RT 15 is substantially closer to CPE $12_1$ than is CO 10, and is substantially closer to CPE $12_2$ than is CO 10. Accordingly, optimization of the data rates over loops LP1, LP2 can be based on the valid assumption that crosstalk from loop LP2 to loop LP1 will dominate, and that crosstalk interference from loop LP1 to loop LP2 is insignificant by comparison.

This "near-far" situation is prevalent in modern DSL systems that utilize fiber optic facilities. In these modem systems, field-installed remote terminals such as ONUs and remote DSLAMs are relatively high strength sources of crosstalk, because they are located substantially closer to subscriber premises than are other central office installations. Accordingly, one may consider RT 15 of FIG. 5 as a neighborhood ONU or DSLAM, in closer proximity to customer premises than CO 10.

Also as shown in FIG. 5, network management center (NMC) 20 is connected to each of CO 10 and RT 15. According to this preferred embodiment of the invention, the communication load between CO 10 and RT 15, on one hand, and NMC 20 on the other hand, is relatively modest. According to the preferred embodiment of the invention, NMC 20 communicates the tone-by-tone Lagrangian multiplier $\lambda_n$ to CO 10 and RT 15; in return, CO 10 communicates only the tolerable PSD $s'_{2,n}$ to NMC 20, and RT 15 communicates only its actual tolerable PSD $s_{2,n}$. In addition, the computational load for optimizing data rates of the two loops is distributed primarily to CO 10 and RT 15, with only a relatively modest amount of calculation required of NMC 20, specifically only so much as to compare the two PSD vectors and to adjust the tone-by-tone Lagrangian multiplier $\lambda_n$. It is further contemplated that each of CO 10 and RT 15, constructed according to modern conventional DSL equipment and programmed according to this description, will have sufficient computational capacity to readily perform the operations described below.

FIG. 6 illustrates the method of power spectrum management for loops LP1 and LP2 according to the preferred embodiment of the invention. It is contemplated that these operations in setting the various power spectral densities (PSDs) will be performed during the initialization of DSL communications, for example during the initialization of a DSL session between CO 10 and CPE $12_1$, which will be referred to as "user 1" in the following description; communications between RT 15 and CPE $12_2$ (i.e., "user 2") may already be established and will be adjusted as a result, or may also be initializing at this time. As known in the art, the initialization procedure for conventional ADSL includes, in general, a handshake procedure between the transceivers on the loop in order to establish communication, "training" of each of the transceivers (e.g., establishing time-domain equalizer and frequency-domain equalizer parameters), analysis of channel characteristics and definition of the PSD and bit loading levels at each transceiver, followed by exchange of the PSD and bit loading between transceivers to coordinate modulation and demodulation over the DMT tones. It is contemplated that the spectrum management method of FIG. 6 will be readily adaptable into the initialization sequence in the establishing of a DSL session, preferably following channel analysis and prior to the exchange sequence. However, it is also contemplated that those skilled in the art having reference to this specification will be readily able to include the spectrum management method of FIG. 6, according to this embodiment of the invention, at an appropriate point in the initialization sequence. In addition, if desired, the spectrum management method of FIG. 6 according to this embodiment of the invention can be performed periodically after communications sessions have been established, to update the PSDs according to channel conditions and to thus effect real-time control.

The spectrum management method according to the preferred embodiment of the invention begins with process 70, in which NMC 20 initializes the values of Lagrangian multiplier $\lambda_n$ for each tone n. Considering that the process of FIG. 6 is an iterative process, the specific initial values of Lagrangian multiplier $\lambda_n$ are not critical. These initial values are then communicated to each of CO 10 and RT 15, over an overhead or control channel. CO 10 and RT 15 then each independently perform calculations to optimize Lagrangian functions $L_2$ and $L_1$, as described above in the Theory of Operation and as will be described below. These independent calculations can be performed, and preferably are performed, simultaneously and in parallel with one another, considering that each optimization involves only parameters that are known or can be established at each location, along with common parameter of the Lagrangian multiplier $\lambda_n$ communicated by NMC 20.

Referring first to CO 10, its Lagrangian optimization process begins with process 72, in which the PSD $s_{1,n}$ is initialized to an arbitrary value. In process 74, CO 10 next executes its Lagrangian optimization, specifically the solving of Lagrangian $L_2$ as described above, in which the data rate of the interfering user 2 is maximized, according to equation (11a), subject to the target data rate $R_{target}$ expressed according to equation (11b), and subject to the power constraints of equations (11c) and (11d). As described above, this maximization problem can be addressed using sub-optimal techniques, such as that described relative to FIGS. 4b and 4c.

Referring now to FIGS. 7 and 8, an example of such a sub-optimal technique for executing process 74, according to the preferred embodiment of the invention, will now be described. This operation begins in process 90, with the initialization of maximum tolerable PSD $s'_{2,n}$ for user 2; again, the particular initial value is not critical, because process 74 is an iterative approach. In process 92, a waterfilling algorithm is executed, filling the available tones, or subchannels, with energy, given the maximum tolerable PSD $s'_{2,n}$ for user 2 that was initialized in process 90. As mentioned above, various waterfilling approaches are known in the art, any one of which will be suitable for carrying out process 92, subject to the user 2 maximum tolerable PSD $s'_{2,n}$ constraint. After waterfilling process 92 defines the user 1 PSD $s_{1,n}$ over all tones n, decision 93 then determines the user 1 data rate for that result, and compares the user 1 data rate against the desired target data rate $R_{target}$ for user 1. If the magnitude of the difference is not yet within a convergence threshold $\epsilon$ (decision 93 is NO), process 74 is not yet complete. The maximum tolerable PSD $s'_{2,n}$ for user 2 is then updated, in process 94, in an attempt to adjust the user 1 data rate closer to its target $R_{target}$.

FIG. 8 illustrates an example of updating process 94, according to the preferred embodiment of the invention. In process 96, those tones n that are unused as a result of the waterfilling of the last iteration of process 92 are identified. Maximum tolerable PSD $s'_{2,n}$ for user 2 is then adjusted, in process 97, by setting $s'_{2,n}$ to its maximum value $P_{2,n}$, for those tones. Next, those tones that are "underused" by user 1 as a result of the last iteration of process 92 are identified, in process 96. According to this embodiment of the invention, process 96 identifies these tones as those in which the user 1 PSD $s_{1,n}$ has an energy level below a certain threshold $\eta$, or alternatively as those tones for which the bit loading $b_{1,n}$ is below a certain value. For these underused tones, process 99 next updates the maximum tolerable PSD $s'_{2,n}$ for user 2 by setting a new value $s'_{2,n}$ corresponding to its previous value, multiplied by a factor $\kappa$ ($\kappa>1$, to increase the user 2 power for that tone). The resulting maximum tolerable PSD $s'_{2,n}$ for user 2 is then used in a next iteration of waterfilling process 92, which should thus return a different user 1 PSD $s_{1,n}$, and thus a different resulting data rate for comparison in decision 93.

Upon decision 93 determining that the user 1 data rate matches its target data rate $R_{target}$, at least within the convergence threshold $\epsilon$, process 74 is complete, and control passes to process 76 (FIG. 6).

It is contemplated that other alternative techniques for maximizing Lagrangian $L_2$ will be apparent to those skilled in the art having reference to this specification. In any case, process 74 determines a PSD $s_{1,n}$ for CO 10 that permits loop LP1 communications for a maximum tolerable PSD $s'_{2,n}$ from user 2, effectively setting the PSD for user 1 that maximizes the data rate of interfering user 2 (i.e., RT 15 to CPE $12_2$ over loop LP2). And in process 76, CO 10 communicates the maximized tolerable PSD $s'_{2,n}$ for user 2 that was found in process 74, and that corresponds to the PSD $s'_{1,n}$ for CO 10, to NMC 20.

Meanwhile, RT 15 is similarly solving a Lagrangian problem according to Lagrangian $L_1$ as described above. Referring to FIG. 6, RT 15 initializes its PSD $s_{2,n}$ in process 73; this may be an arbitrary PSD, or may simply be an existing actual PSD as used in a current communications session. In process 75, RT 15 performs a waterfilling algorithm, as described above relative to FIG. 4a, in order to maximize its local data rate over possible values of PSD $s_{2,n}$, within the applicable power constraint, as described above relative to equations (9a) and (9b). It is contemplated that conventional waterfilling algorithms may be used to perform process 75, using the constraint of equation (9b) as described above; examples of such conventional waterfilling algorithms that can be readily adapted, by those skilled in the art having reference to this specification, to this invention are described in Starr et al., *Understanding Digital Subscriber Line Technology* (Prentice Hall, 1999), pp. 208-217, and in U.S. Pat. No. 5,479,447, incorporated herein by this reference. As a result of process 75, the actual user 2 PSD $s_{2,n}$ derived in process 75 at RT 15 is communicated to NMC 20 in process 77.

Upon receipt of the maximum tolerable PSD $s'_{2,n}$ for user 2, from CO 10, and of the actual PSD $s_{2,n}$ for user 2, from RT 15, NMC 20 performs comparison process 80, in which these two PSD parameters are compared against one another. If the result of comparison process 80 indicates that the actual PSD $s_{2,n}$ derived by RT 15 exceeds the maximum tolerable user 2 PSD $s'_{2,n}$ as derived by CO 10, then the "price" of user 2 power in the overall Lagrangian problem of equation (7) or equation (12) is not high enough to attain an optimal data rate solution. In this case, NMC 20 performs process 82 in which it increases the price multiplier of Lagrangian multiplier $\lambda_n$ by an incremental amount (the particular value of which is not critical, because of the iterative nature of this process), and communicates this new value to each of CO 10 and RT 15 over the appropriate control channel. CO 10 repeats its maximizing process 74 and RT 15 repeats its waterfilling process 75. The new PSD values that are generated in processes 76, 77 are then communicated to NMC 20 for a new comparison in a next instance of comparison process 80.

On the other hand, if process 80 determines that the actual PSD $s_{2,n}$ derived by RT 15 is substantially below the maximum tolerable user 2 PSD $s'_{2,n}$ as derived by CO 10, then the data rate at user 2 is not high enough because the "price" of user 2 power in the overall Lagrangian problem of equation (7) or equation (12) is too high. In this situation, NMC 20 executes process 84, in which it decreases the price multiplier of Lagrangian multiplier $\lambda_n$ by an incremental amount (again, the step size is not critical) and communicates this new value to each of CO 10 and RT 15 over the control or overhead channel. CO 10 then repeats its maximizing process 74, and RT 15 then repeats its waterfilling process 75. The new PSD values generated in this next iteration of processes 76, 77 are then communicated to NMC 20 for a new comparison in a next instance of comparison process 80.

If comparison process 80 determines that the difference Δ between tolerable PSD $s'_{2,n}$ and PSD $s_{2,n}$ is within a certain convergence limit ε, then CO 10 and RT 15 have converged to optimum PSDs $s_{1,n}$ and $s_{2,n}$ respectively, that result in outstanding data rates for both users. The bit loadings, tone-by-tone gains, and other parameters of the modems in each of CO 10 and RT 15 can then be set, or adjusted, according to the optimum PSDs $s_{1,n}$ and $s_{2,n}$ respectively that were derived in the last iteration of processes 74, 75, respectively. The PSD optimization process of FIG. 6 then terminates, in process 85, and steady-state DSL communications, over both of loops LP1, LP2 in the example of FIG. 5, can commence (if the PSD optimization process occurred during initialization) or continue (if the PSD optimization was performed during DSL transmission).

It has been observed, through simulation, that the method of power spectrum management according to this preferred embodiment of the invention compares very favorably with conventional methods, in fact approaching the performance of a full centralized spectrum optimization. For a given two-user problem as shown in FIG. 5, where the linear distance between CO 10 and CPE $12_1$ is 5 km, the distance between RT 15 and CPE $12_2$ is 3 km, and the distance between CO 10 and RT 15, in the direction of loops LP1, LP2 as shown, is 4 km, the spectrum management method according to this preferred embodiment of the invention exhibits a data rate of 7.1 Mbps from RT 15, as compared to a data rate of 3.6 Mbps for the fully distributed iterative waterfilling method described in Yu et al., "Distributed Multiuser Power Control for Digital Subscriber Lines", *Journal on Selected Areas in Communications*, Vol. 20, No. 5 (IEEE; June, 2002), pp. 1105-15, and as compared to a data rate of 7.4 Mbps for the fully centralized method described in Cendrillon et al., "Optimal Multi-user Spectrum Management for Digital Subscriber Lines", 2004 *IEEE International Conference on Communications*, Vol. 1 (Jun. 20-24, 2004), pp. 1-5. The (target) data rates at CO 10 were 1.0 Mbps in each case. Accordingly, the spectrum management method according to this invention provides much improved remote terminal data rate relative to the fully distributed method, and a data rate close to that of the fully centralized method. However, the semi-distributed method according to this invention advantageously requires substantially less communication between the network elements (CO 10, RT 15) and a central management facility than the fully centralized method, and also offloads much of the computational effort to the distributed network elements.

It is therefore contemplated that this invention provides a very efficient approach to power spectrum management in DSL communications, minimizing the overhead communications (and thus maximizing payload), and in a manner that can be readily performed by existing DSL network equipment in the field and at central offices.

Various alternatives to the preferred embodiment of the invention described in this specification are contemplated. According to one such alternative, the implementation of this invention can be greatly simplified by reducing the number of available values for the parameters that are communicated to and from the NMC. In a very simple example, only two values for the tolerable PSD $s'_{2,n}$ are permitted, for example a zero value and a nominal value. In this case, the comparison between tolerable and actual PSDs can still be made at the NMC, and the appropriate Lagrangian multiplier $\lambda_n$ can still be adjusted as described above. It is contemplated that this simplified approach would be well-behaved, and will provide reasonable results, but with greatly reduced communication requirements. Of course, any other number of discrete values for the tolerable PSD $s'_{2,n}$ and the Lagrangian multiplier $\lambda_n$ can alternatively be applied. It is contemplated that these and other alternative implementation approaches, which be evident to those skilled in the art having reference to this specification, are within the scope of this invention as claimed.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of managing power spectra for digital communications from first and second transmitters, comprising the steps of:

initializing a price parameter value;

at the first transmitter, maximizing a tolerable power spectral density for the second transmitter subject to a power spectral density for the first transmitter corresponding to a target data rate at the first transmitter, for the price parameter value;

at the second transmitter, deriving a power spectral density for the second transmitter to maximize a data rate for the second transmitter, for the price parameter value;

comparing the tolerable power spectral density for the second transmitter to the derived power spectral density for the second transmitter;

adjusting the price parameter value responsive to the comparing step; and repeating the maximizing, deriving, comparing, and adjusting steps until the result of the comparing step reaches a convergence criterion;

then setting the power spectral density for the first transmitter to a result of the last repetition of the maximizing step; and setting the power spectral density for the second transmitter to the derived power spectral density from the last repetition of the deriving step.

2. The method of claim 1, further comprising:

after the maximizing step, communicating the tolerable power spectral density for the second transmitter from the first transmitter to a network management center; and after the deriving step, communicating the power spectral density for the second transmitter from the second transmitter to the network management center.

3. The method of claim 2, wherein the comparing and adjusting steps are performed at the network management center.

4. The method of claim 3, further comprising:

after the adjusting step, communicating the adjusted price parameter value from the network management center to the first and second transmitters.

5. The method of claim 1, wherein the digital communications are discrete multitone modulated (DMT) signals communicated over a plurality of frequency tones.

6. The method of claim 5, wherein the deriving step comprises:

performing a waterfilling algorithm at the second transmitter to derive the power spectral density for the second transmitter for a maximized data rate for the second transmitter.

7. The method of claim 6, wherein the maximizing step comprises:

measuring channel characteristics, over the plurality of frequency tones, of a first loop over which the first transmitter transmits DMT signals;

measuring crosstalk coupling, over the plurality of frequency tones, from a second loop over which the second transmitter transmits DMT signals;

maximizing power in the power spectral density of the first transmitter for a first plurality of tones selected responsive to the measuring steps;

minimizing power in the tolerable power spectral density for at least some tones in the first plurality of tones.

8. The method of claim 1, wherein the maximizing and deriving steps comprise solving Lagrangian problems.

9. A method of power spectrum management for discrete multitone modulation (DMT) signals communicated in a multiple-user digital subscriber line network, the network including a central office location, a remote terminal, and a network management center, and the method comprising the steps of:

at the central office location, identifying a central office power spectral density that maximizes a tolerable power spectral density for the remote terminal subject to the central office power spectral density providing a central office data rate that meets a target data rate, for a current value of a price parameter;

communicating the maximized tolerable power spectral density to a network management center;

at the remote terminal deriving a remote terminal power spectral density to maximize a remote terminal data rate, for the current value of the price parameter;

communicating the remote terminal power spectral density to the network management center;

at the network management center, adjusting the value of the price parameter responsive to a comparing of the tolerable power spectral density to the remote terminal power spectral density;

repeating the identifying, deriving, comparing, and adjusting steps for a convergence criteria; and then transmitting DMT signals from the central office according to the central office power spectral density; and transmitting DMT signals from the remote terminal according to the remote terminal power spectral density.

10. The method of claim 9, wherein the step of transmitting DMT signals from the central office transmits DMT signals over a plurality of subscriber loops;

and wherein the step of transmitting DMT signals from the remote terminal transmits DMT signals over a plurality of subscriber loops.

11. The method of claim 9, wherein the adjusting step comprises:

increasing the value of the price parameter responsive to the remote terminal power spectral density exceeding the tolerable power spectral density; and decreasing the value of the price parameter responsive to the tolerable power spectral density exceeding the remote terminal power spectral density.

12. The method of claim 11, wherein the convergence criteria comprises the remote terminal power spectral density differing from the tolerable power spectral density by less than a convergence limit.

13. The method of claim 9, wherein the deriving step comprises:

performing a waterfilling algorithm at the remote terminal to derive the remote terminal power spectral density corresponding to a maximized remote terminal data rate, using the current value of the price parameter.

14. The method of claim 9, wherein the identifying step comprises:

measuring channel characteristics, over the plurality of frequency tones, of a first loop over which the central office transmits DMT signals;

measuring crosstalk coupling, over the plurality of frequency tones, from a second loop over which the remote terminal transmits DMT signals;

maximizing power in the central office power spectral density for a first plurality of tones selected responsive to the measuring steps;

minimizing power in the tolerable power spectral density for at least some tones in the first plurality of tones.

* * * * *